United States Patent
Talayssat et al.

(10) Patent No.: US 10,306,248 B2
(45) Date of Patent: May 28, 2019

(54) METHOD AND DEVICE FOR GENERATION OF A REPRESENTATION OF A DIGITAL IMAGE

(71) Applicants: STMicroelectronics (Grenoble 2) SAS, Grenoble (FR); STMicroelectronics (Rousset) SAS, Rousset (FR)

(72) Inventors: Jacques Talayssat, Opio (FR); Sébastien Cleyet-Merle, Voiron (FR); Vitor Schwambach Costa, Grenoble (FR)

(73) Assignees: STMicroelectronics (Rousset) SAS, Rousset (FR); STMicroelectronics (Grenoble 2) SAS, Grenoble (FR)

( * ) Notice: Subject to any disclaimer, the term of this patent is extended or adjusted under 35 U.S.C. 154(b) by 242 days.

(21) Appl. No.: 14/929,129

(22) Filed: Oct. 30, 2015

(65) Prior Publication Data

US 2016/0309176 A1    Oct. 20, 2016

(30) Foreign Application Priority Data

Apr. 17, 2015  (FR) .................................. 15 53461

(51) Int. Cl.
*G06K 9/46*   (2006.01)
*H04N 19/426*   (2014.01)
(Continued)

(52) U.S. Cl.
CPC ....... *H04N 19/426* (2014.11); *G06K 9/00973* (2013.01); *G06K 9/26* (2013.01);
(Continued)

(58) Field of Classification Search
None
See application file for complete search history.

(56) References Cited

U.S. PATENT DOCUMENTS

| | | | | |
|---|---|---|---|---|
| 5,917,935 A | * | 6/1999 | Hawthorne | ........... G02F 1/1303 348/126 |
| 6,041,143 A | * | 3/2000 | Chui | .................... G06T 3/4084 375/E7.013 |

(Continued)

OTHER PUBLICATIONS

Herout, A., et al., "Low-Level Image Features for Real-Time Object Detection," Pattern Recognition Recent Advances, Intech, Feb. 2010, pp. 111-136.

(Continued)

*Primary Examiner* — Bernard Krasnic
(74) *Attorney, Agent, or Firm* — Slater Matsil, LLP

(57) ABSTRACT

A method and device for real-time generation of a multi-resolution representation of a digital image for real-time generation are disclosed. A sequence of main representations of the digital image is stored at successive different main resolutions in a main memory. A part of a current main representation is loaded from the main memory into a local memory via a bus. A current main representation is processed by determining a corresponding part of an intermediate representation of the image having an intermediate resolution lying between the resolution of the current main representation and the resolution of the subsequent main representation. The loading and processing steps are repeated for other parts of the current main representation until all parts of the current main representation have been successively loaded and processed.

10 Claims, 1 Drawing Sheet

(51) Int. Cl.
*G06K 9/26* (2006.01)
*G06K 9/62* (2006.01)
*G06K 9/00* (2006.01)

(52) U.S. Cl.
CPC ......... *G06K 9/4614* (2013.01); *G06K 9/6264* (2013.01); *G06K 9/6285* (2013.01)

(56) References Cited

U.S. PATENT DOCUMENTS

| | | | |
|---|---|---|---|
| 7,031,499 | B2 | 4/2006 | Viola et al. |
| 8,547,389 | B2* | 10/2013 | Hoppe .................. G06T 5/50 345/589 |
| 8,687,700 | B1 | 4/2014 | Kwok et al. |
| 9,401,001 | B2* | 7/2016 | Reed .................. G06T 1/0028 |
| 2008/0025568 | A1 | 1/2008 | Han et al. |
| 2009/0263022 | A1* | 10/2009 | Petrescu ............ G06K 9/00234 382/195 |
| 2011/0096995 | A1 | 4/2011 | Ito |
| 2011/0211233 | A1 | 9/2011 | Yokono |
| 2011/0243438 | A1 | 10/2011 | Hoppe et al. |
| 2012/0134577 | A1* | 5/2012 | Sabe .................. G06K 9/6256 382/159 |
| 2014/0003662 | A1 | 1/2014 | Wang et al. |
| 2015/0110351 | A1* | 4/2015 | Csefalvay ............ G06T 7/11 382/103 |

OTHER PUBLICATIONS

Lazebnik, S. et al., "Beyond bags of features: spatial pyramid matching for recognizing natural scene categories," IEEE Conference on Computer Vision & Pattern Recognition (CPRV'06), Jun. 2006, pp. 2169-2178.

Viola, P. et al., "Robust Real-time Object Detection," Second International Workshop on Statistical and Computational Theories of Vision—Modeling, Learning, Computing, and Sampling, Jul. 13, 2001, 25 pages.

Zafeiriou, S., et al., "A survey on face detection in the wild: Past, present and future," Computer Vision and Image Understanding, vol. 138, Apr. 18, 2015, pp. 1-24.

* cited by examiner

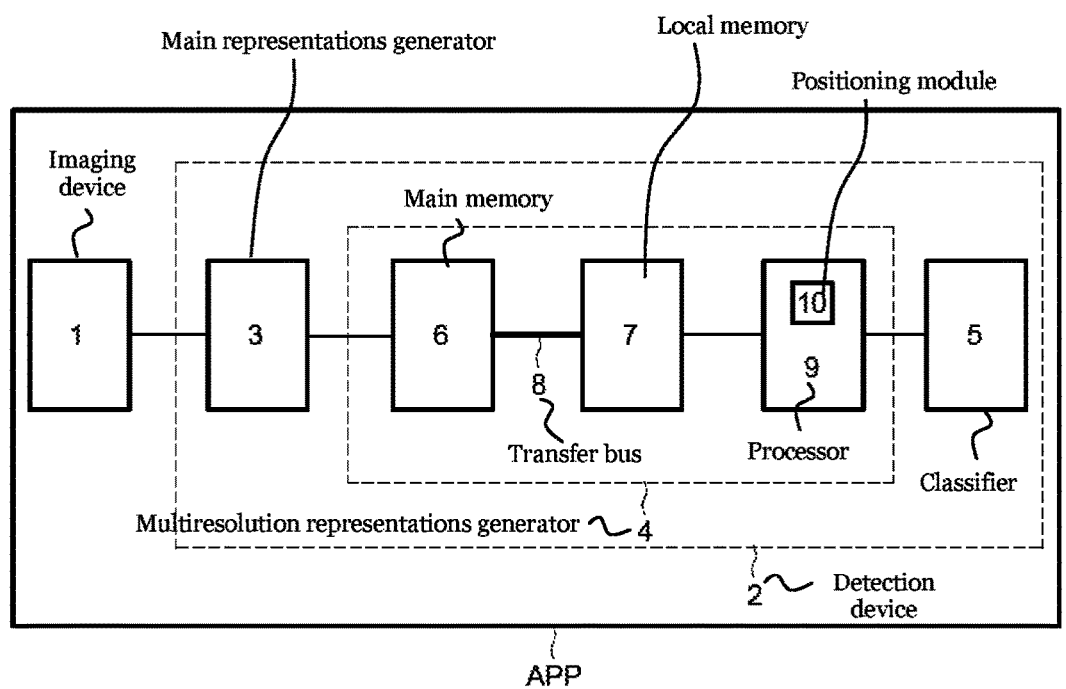
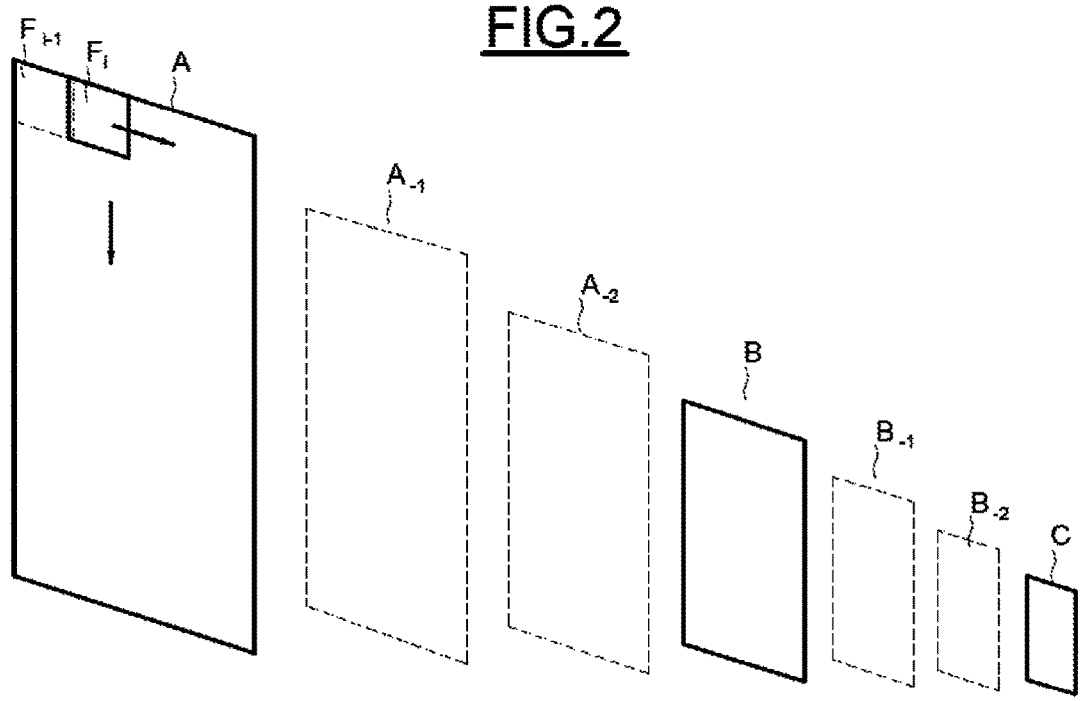

METHOD AND DEVICE FOR GENERATION OF A REPRESENTATION OF A DIGITAL IMAGE

This application claims priority to French Patent Application No. 1553461, filed on Apr. 17, 2015, which application is hereby incorporated herein by reference.

TECHNICAL FIELD

Applications and embodiments of the invention relate to the real-time generation of a multiresolution representation of a digital image and its application to object detection in a digital image, particularly by using detection methods of the "scan window" type such as the Viola-Jones method.

BACKGROUND

The Viola-Jones method is a known method for object detection in a digital image. It is one of the methods capable of detecting objects effectively in real time in an image by means of a sliding detection window.

It is generally used for detecting faces and persons, but can also be used for detecting other objects such as road vehicles or aircraft.

The Viola-Jones method is based on a supervised learning method. It therefore requires several hundred to several million examples of the object to be detected, in order to train a classifier. When its learning is complete, this classifier is used to detect any presence of the object in an image by scanning the image exhaustively in all positions and at all possible sizes and scales.

Being a supervised learning method, this method is divided into two stages, namely a classifier training stage based on a large number of positive examples, that is to say objects of interest such as faces, and negative examples, such as images indicated as not representing faces, followed by a phase of detection by application of this classifier to unknown images.

The Viola-Jones method is an approach based on appearance, and consists in scanning the whole image by means of a "scan window", while calculating a certain number of characteristics in overlapping rectangular areas, or detection windows. It has the distinctive feature of using very simple, but very numerous characteristics.

The characteristics are a synthetic and informative representation calculated on the basis of the values of the pixels. The Haar-like characteristics which are used by the Viola-Jones method are calculated by arithmetical operations on the values of sums of pixels of one or more rectangular areas.

In order to calculate these characteristics on an image quickly and efficiently, the Viola-Jones method uses integral images.

An integral image, or "summed area table" in English, is a representation in the form of a digital image, of the same size as the original image, which contains, at each of its points, the sum of the pixels x and y located above and to the left of this point. More formally, the integral image ii is defined on the basis of the image i by:

$$ii(x,y) = \Sigma_{x' \le x, y' \le y} i(x',y')$$

Because of this representation in the form of a correspondence table, the sum of the values in a rectangular area can be calculated in only four accesses to the integral image, and even in only six accesses for two contiguous rectangular areas, and therefore in a constant time regardless of the size of the area.

In the detection phase, the whole image is scanned by moving the detection window through a certain interval in the horizontal and/or vertical direction.

The Viola-Jones method is implemented by using a pyramid for each image to be analysed. In image processing, the pyramid is a multiresolution representation of an image. It can be used to model the image at different resolutions, from the initial image to a very coarse image. The image pyramid enables the detection method using the Viola-Jones method to work from the details to the "coarse" level, so that objects of different sizes, at a number of distances, can be detected.

A drawback of the Viola-Jones method concerns the bandwidth required in the interconnecting bus which couples a memory storing the representations, at the different resolutions of an image after the multiresolution representation of the image has been carried out, to the processor, making it possible, notably, to calculate the integral images for each resolution.

SUMMARY

According to one embodiment, a method of detection by the Viola-Jones method is proposed, using a method of real-time generation of a multiresolution representation of a digital image, enabling the bandwidth used in a transfer bus to be reduced, thereby allowing the images to be detected in real time.

According to one aspect, a method is proposed for the real-time generation of a multiresolution representation of a digital image, comprising the storage in a main memory of a sequence of main representations of the image at successive different main resolutions, and processing comprising, for at least one current main representation:

a) loading at least a part of the current main representation into a local memory via a bus, b) optionally, scanning the at least one loaded part of the current main representation by means of a rectangular detection window, c) optionally, depending on the nature of the classifier used, and at each position in the scan, calculating an integral image of the image portion contained in the detection window, d) determining at least one corresponding part of at least one intermediate representation of the image having an intermediate resolution lying between the resolution of the current main representation and the resolution of the next main representation; optionally, scanning at least a corresponding part of the intermediate representation by means of the rectangular detection window; and optionally, depending on the nature of the classifier used, at each position in the scan, calculating an integral image of the image portion contained in the detection window, e) repeating steps a) to d) with the various parts of the current main representation until all the parts of the current main representation have been successively loaded and processed, and repeating steps a) to e) if necessary, for at least one subsequent main representation.

Because of the presence of the local memory, it is possible to store only a limited number of main representations of the image at different main resolutions in the main memory. Since the number of main representations to be loaded from the main memory to the local memory via the transfer bus is reduced, the bandwidth of the transfer bus is reduced.

The local memory can then be used to construct intermediate representations of the image at intermediate resolutions on the basis of one of the main representations, or to construct them part by part on the basis of part of the main representations successively loaded into the local memory. The resulting intermediate representations can be used, with the main representations, to construct an image pyramid comprising representations of the image at each of the resolutions used for detecting an object in the image.

Depending on the desired number of representations at different resolutions, the processing unit may repeat steps a) to e) for at least one other main representation stored in the main memory, up to the penultimate or final representation if necessary.

The optional characteristics mentioned above could be provided by the classifier of an object detection device, or during the aforesaid processing relating to the at least one current main representation.

Advantageously, the method may comprise, for each iteration of steps a) to d), at least one repetition of steps c) and d) to determine at least a corresponding part of at least one new intermediate representation of the image having an intermediate resolution lying between the intermediate resolution of the preceding intermediate representation and the main resolution of the next main representation, and, optionally, causing at least a corresponding part of the new intermediate representation to be scanned by means of a rectangular detection window, and, optionally, depending on the nature of the detector used, and at each position in the scan, calculating an integral image of the image portion contained in the detection window.

Depending on the desired fineness of detection, that is to say the number of different resolutions examined for the same image, a plurality of supplementary intermediate representations may be generated in cascade on the basis of the intermediate representation generated previously, having decreasing resolutions which are, however, always higher than the main resolution of the next main representation.

Preferably, the movement of the detection window between two positions of the detection window is smaller than the size of the window, so that at least a part of the detection window overlaps the detection window in its previous position.

The interval of movement of the window makes it possible to reduce the number of positions to be evaluated and thereby improve the execution performance. The effectiveness of detection is increased by the reduction in the interval, because the fineness of searching is greater.

Preferably, the detection window is moved in a first direction of the image, which is preferably horizontal, and shifted in a second direction of the image, which is preferably vertical and orthogonal to the first direction, whenever the detection window has reached an end of the image in the first direction, the movement of the detection window in the first direction taking place from one end of the image to the opposite end.

Thus this movement enables the calculation to be performed systematically with the assurance that the whole surface of the image is covered.

According to another aspect, what is proposed is a method of using a sliding detection window method, for example a Viola-Jones method, for the real-time detection of at least one object in a digital image, comprising the generation of a succession of main representations of the image at different successive main resolutions, a method of real-time generation of a multiresolution representation of the digital image as defined above applied to the main representations of the image, and the processing of the integral images calculated by classifiers using the Viola-Jones method.

According to yet another aspect, a method is proposed for the real-time generation of a multiresolution representation of a digital image, comprising a main memory capable of storing a succession of main representations of the image at different main resolutions, a local memory coupled to the main memory via a bus and capable of storing at least part of a current main representation, and a processing unit configured for the following operations, for at least one current main representation:

a) loading at least a part of the current main representation into the local memory, b) optionally, causing the at least one loaded part of the current main representation to be scanned by means of a rectangular detection window, c) optionally, depending on the nature of the classifier used, and at each position in the scan, calculating an integral image of the image portion contained in the detection window, d) determining at least one corresponding part of at least one intermediate representation of the image having an intermediate resolution lying between the resolution of the current main representation and the resolution of the next main representation; optionally, scanning at least a corresponding part of the intermediate representation by means of the rectangular detection window; and optionally, depending on the nature of the classifier used, at each position in the scan, calculating an integral image of the image portion contained in the detection window, e) repeating steps a) to d) with the various parts of the current main representation until all the parts of the current main representation have been successively loaded and processed, the processing unit also being configured to repeat steps a) to e) if necessary, for at least one subsequent main representation.

Advantageously, the processing unit may also be configured to reiterate step d) at least once, for each iteration of steps a) to d), in order to determine at least a corresponding part of at least one new intermediate representation of the image having an intermediate resolution lying between the intermediate resolution of the preceding intermediate representation and the main resolution of the next main representation, and, optionally, to cause the at least one corresponding part of the new intermediate representation to be scanned by means of a rectangular detection window, and, optionally, to calculate, at each position in the scan, an integral image of the image portion contained in the detection window.

Preferably, the processing unit is configured to cause the movement of the detection window between two successive positions so that at least a part of the detection window overlaps the detection window in its previous position.

The processing unit is preferably configured to move the window in a first direction of the image, which is preferably horizontal, and to shift it in a second direction of the image, which is preferably vertical and orthogonal to the first direction, whenever the detection window has reached an end of the image in the first direction, the movement of the detection window in the first direction taking place from one end of the image to the opposite end.

According to another aspect, a device is proposed for real-time detection, using a detection window method, for example a Viola-Jones method, of at least one object in a digital image, comprising means for generating a succession of main representations of the image at different main resolutions, a device for the generation of a multiresolution representation of the digital image as defined above, and means for processing the calculated integral images by means of the Viola-Jones method.

According to yet another aspect, a piece of electronic equipment comprising a detection device as defined above is proposed.

BRIEF DESCRIPTION OF THE DRAWINGS

Other advantages and features of the invention will be apparent from an examination of the detailed description of an embodiment of the invention, which is not limiting in any way, and the appended drawings, in which:

FIG. 1 shows schematically a piece of electronic equipment comprising a device for the real-time detection of at least one object in a digital image by the Viola-Jones method, according to an embodiment of the invention; and FIG. 2 shows schematically some main and intermediate representations of a pyramid of images generated according to an embodiment of the invention.

DETAILED DESCRIPTION OF ILLUSTRATIVE EMBODIMENTS

FIG. 1 shows schematically a piece of electronic equipment comprising a device for the real-time detection of at least one object in a digital image by the Viola-Jones method, according to an embodiment of the invention.

The electronic equipment APP comprises, for example, an imaging device 1 such as a digital camera or video camera, and a detection device 2 to which the imaging device 1 is coupled.

The detection device 2, intended to detect at least one object in a digital image in real time by the Viola-Jones method, comprises means 3 for the real-time generation of a pyramid of main representations, at successive different main resolutions, of each image received. These means 3 are coupled to the imaging device 1 and are capable of generating a succession of main representations of the image at different main resolutions.

The detection device 2 further comprises a device 4 for the real-time generation of a multiresolution representation of each digital image received from the imaging device 1 by the detection device 2, and classifiers 5 for the execution of the Viola-Jones method. These classifiers are intended to receive the integral images and the main and intermediate representations delivered by the generation device 4, notably at each horizontal or vertical movement of the detection window.

The device 4 comprises a main memory 6, for example a DRAM memory, which is coupled to the output of the means 3 for generating a pyramid of main representations, and is capable of storing, for each image, the main representations of the image at the various main resolutions.

The device 4 further comprises a local memory 7, for example an SRAM memory, coupled via a transfer bus 8 to the main memory 6. The local memory 7 is smaller than the main memory 6. Depending on the embodiment, the local memory 7 is configured to store one main representation of the image at a time, or possibly one part or strip of a main representation of the image at a time, for the purpose of performing a number of subsamplings of the main representation and calculations of integral images for each of the subsamplings.

In order to simplify the generation of a multiresolution representation as far as possible, a full image can effectively be stored in the local memory 7.

However, by storing only one strip of a main representation, updated line by line for example, it is possible to generate the intermediate resolutions between two main resolutions for this image strip. The size of the image strip and the choice of the subsampling factor between two main resolutions make it possible to provide all the possible intermediate resolutions between these two main resolutions.

The device 4 further comprises a processing unit 9, which is configured to generate a rectangular detection window F and to move it over the whole image, and which can calculate an integral image of the detection window at each of its positions.

FIG. 2 shows schematically some main and intermediate representations of a pyramid of images generated according to an embodiment of the invention.

The main representations A, B and C of the image are shown in solid lines. The main representations A, B and C are representations of the processed image generated by the generating means 3. These main representations A, B and C have different main resolutions, for example resolutions of 1, ¼, ¹⁄₁₆, ¹⁄₆₄, and so on. The resolution of ¼ corresponds to a resolution of ½ in horizontal terms and ½ in vertical terms. These main representations A, B and C are stored in the main memory 7.

The generation device 4 loads the main representations A, B and C, one by one, into its local memory 7. When one of the main representations A, B or C is loaded into the local memory 7, the main or intermediate representation preceding it in memory is overwritten.

In the example shown in FIG. 2, the main representation A, having a main resolution of 1 for example, is initially loaded into the local memory 7 via the transfer bus 8.

The processing unit 9 then generates a rectangular detection window F, measuring 48 by 48 pixels for example, and calculates the corresponding integral image at each position $F_i$ of the detection window F.

The various functions of the processing unit 9 which will now be described may be executed by software modules within a microprocessor.

The processing unit 9 comprises a positioning software module 10 capable of causing the detection window F to move between two successive positions $F_{i-1}$ and $F_i$. The detection window F is moved from a preceding position $F_{i-1}$ to a subsequent position $F_i$ through a distance smaller than the length of the detection window in the direction of its movement, so that at least a part of the detection window in the subsequent position $F_i$ overlaps the detection window F in its preceding position $F_{i-1}$.

As shown by the arrows, the detection window F is moved in a horizontal direction of the main representation A, and then in a vertical direction of the main representation A. The detection window F is thus moved downwards from line to line. In the illustrated embodiment, whenever the detection window F is moved in the vertical direction, it is repositioned at the start of a line so as to partially overlap the position of the detection window at the start of the preceding line, corresponding to the position denoted $F_{i-1}$ in this case.

The processing unit 9 is also configured to execute a subsampling of the content of the local memory 7. More precisely, the processing unit 9 is configured to determine at least one intermediate representation $A_{-1}$, $A_{-2}$, $B_{-1}$, $B_{-2}$ of the image, in this case two representations as in the example shown in FIG. 2, having an intermediate resolution lying between the resolution of the current main representation, A or B in the illustrated example, and the resolution of the subsequent main representation, B or C respectively, in the illustrated example.

In the illustrated example, the intermediate resolution $A_{-1}$ is therefore between 1 and ¼.

When the intermediate representation $A_{-1}$ has been determined, the processing unit 9 is configured to cause the intermediate representation $A_{-1}$ to be scanned by the rectangular detection window F, and optionally, depending on the nature of the classifier used, and at each position $F_i$ of the scan, to calculate an integral image of the detection window F.

It is possible to determine the representation $A_{-1}$ in advance, and store it in the local memory 7 before calculating the integral images, or alternatively to determine the representation $A_{-1}$ and calculate the integral image of each window during the course of the operation.

After the determination of the first intermediate representation $A_{-1}$ has been completed, the second intermediate representation $A_{-2}$ is calculated directly on the basis of the main representation A stored in the local memory 7.

The number of strips of intermediate resolution $A_{-1}$, $A_{-2}$ . . . A-i that can be generated for this strip of main resolution before a vertical increment of n lines depends on the number of image lines that can be stored in the local memory 7.

In a variant, this intermediate representation $A_{-1}$ could, for example, be stored fully or partially in the local memory 7 so as to be processed by the processing unit 9 in order to construct at least a part of the second intermediate representation $A_{-2}$ and determine the integral images for this second intermediate representation $A_{-2}$.

The intermediate resolution of the intermediate representation $A_{-2}$ lies between the intermediate resolution of the preceding intermediate representation $A_{-1}$ and the main resolution of the subsequent main representation B. The calculation of the integral images of the representation $A_{-2}$ is identical to that performed for the representation $A_{-1}$.

On completion of this processing, in the example shown in FIG. 1, the generation device 4 loads the second main representation B into the local memory 7 so that it can be processed by the processing unit 9 in order to calculate the integral images of the main representation B and of the two intermediate representations $B_{-1}$ and $B_{-2}$ and construct the intermediate representations $B_{-1}$ and $B_{-2}$ in themselves.

Then, in the example shown in FIG. 2, the generation device 4 loads a third main representation C into the local memory 7 so that it can be processed by the processing unit 9 in order to calculate the integral images of the main representation C.

The image windows, or integral image windows, calculated for each main representation A, B, C and intermediate representation $A_{-1}$, $A_{-2}$, $B_{-1}$, $B_{-2}$ are delivered to the classifier 5 of the detection device 2, together with the main representations A, B, C or the intermediate representations $A_{-1}, A_{-2}, B_{-1}, B_{-2}$ so that the object detection can take place at the different resolutions of the image.

The system and method of detection by the Viola-Jones method, using a method of real-time generation of a multi-resolution representation of a digital image based on the generation of intermediate resolutions on the basis of main resolutions, enable the bandwidth used in a transfer bus to be reduced, thereby allowing object detection to be performed on digital images in real time.

What is claimed is:

1. A method for real-time generation of a multiresolution representation of a digital image, the method comprising: storing a sequence of main representations of the digital image at successive different main resolutions; and processing a current main representation by:
    a) loading a part of the current main representation into a local memory via a bus;
    b) scanning the loaded part of the current main representation using a rectangular detection window;
    c) at each position in the scan, calculating an integral image of a portion of the digital image contained in the detection window;
    d) determining at least one corresponding part of at least one intermediate representation of the digital image having an intermediate resolution lying between the resolution of the current main representation and the resolution of the subsequent main representation, scanning at least a corresponding part of the intermediate representation by using the rectangular detection window, and calculating, at each position in the scan, an integral image of the portion of the digital image contained in the detection window;
    e) repeating steps a) to d) with other parts of the current main representation until all parts of the current main representation have been successively loaded and processed; and
    repeating steps a) to e) for a plurality of subsequent main representations.

2. The method according to claim 1, comprising, for each iteration of steps a) to d), repeating step d) to determine at least a corresponding part of at least one new intermediate representation of the digital image having an intermediate resolution lying between the intermediate resolution of the preceding intermediate representation and the main resolution of the subsequent main representation, causing at least a corresponding part of the at least one new intermediate representation to be scanned using the rectangular detection window, and, at each position in the scan, calculating an integral image of the portion of the digital image contained in said detection window.

3. The method according to claim 1, wherein movement between two positions of the detection window is smaller than a size of the detection window, so that a part of the detection window overlaps the detection window in its preceding position.

4. The method according to claim 1, wherein the detection window is moved in a first direction of the digital image and shifted in a second direction of the digital image, which is orthogonal to the first direction, whenever the detection window has reached an end of the digital image in the first direction, the movement of the detection window in the first direction taking place from one end of the digital image to an opposite end.

5. A method of real-time detection of an object in a digital image using a Viola-Jones method, the method comprising:
    generating a sequence of main representations of the digital image at different successive main resolutions;
    performing the method of claim 1 to the main representations of the digital image; and
    processing the integral images calculated by classifiers executing the Viola-Jones method.

6. A device comprising:
    a main memory storing a sequence of main representations of a digital image at different main resolutions;
    a local memory coupled to the main memory via a bus;
    a processor coupled to the local memory and configured for, for a current main representation, executing instructions to perform the steps of :

a) loading a part of the current main representation into the local memory;
b) causing the loaded part of the current main representation to be scanned using a rectangular detection window;
c) calculating, at each position in the scan, an integral image of a portion of the digital image contained in the detection window;
d) determining at least one corresponding part of at least one intermediate representation of the digital image having an intermediate resolution lying between the resolution of the current main representation and the resolution of the subsequent main representation, scanning at least a corresponding part of the at least one intermediate representation using the rectangular detection window, and calculating, at each position in the scan, an integral image of the portion of the digital image contained in the detection window;
e) repeating steps a) to d) with various parts of the current main representation until all parts of the current main representation have been successively loaded and processed; and
f) repeating steps a) to e) for a subsequent main representation.

7. The device according to claim 6, wherein the processor is further configured to execute instructions to repeat step d) at least once, for each iteration of steps a) to d), in order to determine at least a corresponding part of at least one new intermediate representation of the digital image having an intermediate resolution lying between the intermediate resolution of the preceding intermediate representation and the main resolution of the subsequent main representation, cause at least a corresponding part of the new intermediate representation to be scanned by using the rectangular detection window, and, at each position in the scan, calculate an integral image of the portion of the digital image contained in the detection window.

8. The device according to claim 6, wherein the processor is further configured to execute instructions to cause movement of the detection window between two successive positions so that a part of the detection window overlaps the detection window in its preceding position.

9. The device according to claim 8, wherein the processor is further configured to execute instructions to move the detection window in a first direction of the digital image and to shift it in a second direction of the digital image, which is orthogonal to the first direction, whenever the detection window has reached an end of the digital image in the first direction, the movement of the detection window in the first direction taking place from one end of the digital image to an opposite end.

10. The device according to claim 6, wherein the device utilizes a Viola-Jones method.

* * * * *